US012749810B2

(12) United States Patent
Qin

(10) Patent No.: US 12,749,810 B2
(45) Date of Patent: Sep. 29, 2026

(54) WEARABLE DEVICE AND METHOD FOR CONTROLLING WEARABLE DEVICE

(71) Applicant: VIVO MOBILE COMMUNICATION CO., LTD., Guangdong (CN)

(72) Inventor: Yuan Qin, Hangzhou (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 324 days.

(21) Appl. No.: 18/440,044

(22) Filed: Feb. 13, 2024

(65) Prior Publication Data

US 2024/0186698 A1 Jun. 6, 2024

Related U.S. Application Data

(63) Continuation of application No. PCT/CN2022/115871, filed on Aug. 30, 2022.

(30) Foreign Application Priority Data

Aug. 31, 2021 (CN) ......................... 202111012445.8

(51) Int. Cl.
*H01Q 3/36* (2006.01)
*H01Q 1/27* (2006.01)

(52) U.S. Cl.
CPC ............... *H01Q 3/36* (2013.01); *H01Q 1/273* (2013.01)

(58) Field of Classification Search
CPC ...... H01Q 1/243; H01Q 1/273; H01Q 3/2605; H01Q 3/30–42; A61B 5/681; G06F 1/163; G04H 21/04; H04W 4/80
See application file for complete search history.

(56) References Cited

U.S. PATENT DOCUMENTS

| | | | | |
|---|---|---|---|---|
| 5,886,669 | A | 3/1999 | Kita | |
| 2012/0218162 | A1* | 8/2012 | Aoki ...................... | H01Q 5/321 343/893 |
| 2014/0285385 | A1 | 9/2014 | Aoki et al. | |
| 2016/0043750 | A1 | 2/2016 | Borlenghi | |
| 2017/0358850 | A1* | 12/2017 | Vanjani ................. | G06F 1/1656 |
| 2021/0210853 | A1 | 7/2021 | Luo et al. | |

(Continued)

FOREIGN PATENT DOCUMENTS

| | | | |
|---|---|---|---|
| CN | 110492918 | A | 11/2019 |
| CN | 111029731 | A | 4/2020 |
| CN | 112164893 | A | 1/2021 |

(Continued)

*Primary Examiner* — Cassi J Galt
(74) *Attorney, Agent, or Firm* — Price Heneveld LLP

(57) ABSTRACT

This application discloses a wearable device and a method for controlling the wearable device. The wearable device includes a wearable body, a wearable band, a first antenna module and a second antenna module, where the wearable body is connected to the wearable band; the first antenna module is disposed on the wearable body, and the second antenna module is disposed on the wearable band; and a phase difference between the first antenna module and the second antenna module is adjustable, so that a directivity pattern of an antenna array is adjustable, where the antenna array includes the first antenna module and the second antenna module; and the first antenna module is an active antenna module, and the second antenna module is a passive antenna module.

18 Claims, 6 Drawing Sheets

(56) References Cited

U.S. PATENT DOCUMENTS

| | | | | |
|---|---|---|---|---|
| 2022/0102855 | A1 | 3/2022 | Jia | |
| 2022/0155817 | A1* | 5/2022 | Woods, Jr. | H01Q 1/242 |

FOREIGN PATENT DOCUMENTS

| | | | |
|---|---|---|---|
| CN | 112216957 | A | 1/2021 |
| CN | 112234356 | A | 1/2021 |
| CN | 113690577 | A | 11/2021 |
| KR | 20160026401 | A | 3/2016 |

* cited by examiner

WEARABLE DEVICE AND METHOD FOR CONTROLLING WEARABLE DEVICE

CROSS-REFERENCE TO RELATED APPLICATIONS

The present invention is a Bypass Continuation Application of PCT International Application No. PCT/CN2022/115871 filed on Aug. 30, 2022, which claims priority to Chinese Patent Application No. 202111012445.8, filed with the China National Intellectual Property Administration on Aug. 31, 2021 and entitled "WEARABLE DEVICE AND METHOD FOR CONTROLLING WEARABLE DEVICE", which are incorporated herein by reference in their entireties.

TECHNICAL FIELD

This application relates to the communication field, and in particular, to a wearable device and a method for controlling the wearable device.

BACKGROUND

With the development of science and technology, various wearable devices enter people's daily life, thereby facilitating people's life. For example, a wearable device may monitor a heart rate, a body temperature, and the like of a wearer, and may be further used for communication.

A communication function of the wearable device (for example, a smart watch) relies on an antenna. However, in a case that a user who uses the wearable device engages in activities with large movements, such as running, a location of the wearable device may change, thereby affecting a radiation effect of the antenna on the wearable device, and thus affecting a communication effect of the wearable device.

SUMMARY

Embodiments of this application provide a wearable device and a method for controlling the wearable device.

According to a first aspect, a wearable device is provided, and the wearable device includes:

- a wearable body, a wearable band, a first antenna module and a second antenna module, where the wearable body is connected to the wearable band; and
- the first antenna module is disposed on the wearable body, and the second antenna module is disposed on the wearable band; and a phase difference between the first antenna module and the second antenna module is adjustable, so that a directivity pattern of an antenna array is adjustable, where the antenna array includes the first antenna module and the second antenna module; and
- the first antenna module is an active antenna module, and the second antenna module is a passive antenna module.

According to a second aspect, a method for controlling the wearable device according to the first aspect is provided, and the method includes:

- adjusting a phase difference of the antenna array; and
- adjusting a directivity pattern of the antenna array by adjusting the phase difference of the antenna array.

BRIEF DESCRIPTION OF DRAWINGS

The accompanying drawings described herein are intended to provide a further understanding of the present invention, and constitute a part of the present invention. The illustrative embodiments of the present invention and descriptions thereof are intended to describe the present invention, and do not constitute limitations on the present invention. In the accompanying drawings.

REFERENCE NUMERALS

110—Wearable body; 120—Wearable band; 130—First antenna module; 140—Second antenna module; 150—Switch assembly; 151—First end; 152—Second end; 1521—1st second end; 1522—2nd second end, 1523—3rd second end; 1524—4th second end; 161—First directivity pattern; 162—Second directivity pattern; 163—Third directivity pattern; 164—Fourth directivity pattern; 170—Reactance component; 181—First switch element; 182—Second switch element; 183—Third switch element; 184—Fourth switch element; 191—First directivity pattern; 192—Second directivity pattern; 193—Third directivity pattern; 194—Fourth directivity pattern; 200—Mode switching switch.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
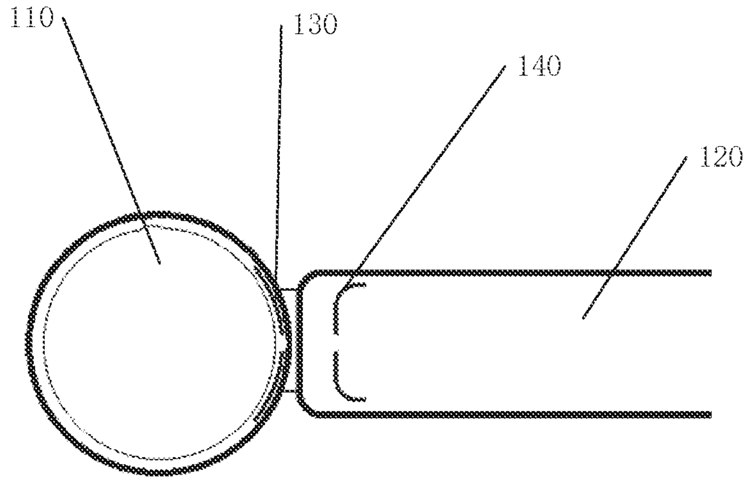
FIG. 1 is a schematic diagram of a wearable device according to an embodiment of this application.

FIG. 1 is a schematic diagram of a wearable device according to an embodiment of this application.

As shown in FIG. 1, the wearable device provided in this embodiment of this application includes a wearable body 110, a wearable band 120, a first antenna module 130, and a second antenna module 140, where the wearable body 110 is connected to the wearable band 120; the first antenna module 130 is disposed on the wearable body 110, and the second antenna module 140 is disposed on the wearable band 120; a phase difference between the first antenna module 130 and the second antenna module 140 is adjustable, so that a directivity pattern of an antenna array is adjustable, where the antenna array includes the first antenna module 130 and the second antenna module 140; and the first antenna module 130 is an active antenna module, and the second antenna module 140 is a passive antenna module.

Both the first antenna module 130 and the second antenna module 140 may be antennas used for communication, such as a broadcast antenna and a Wi-Fi antenna, or may be antennas used for positioning, or may be other types of antennas.

A phase of the second antenna module 140 may be adjusted, and the first antenna module 130 and the second antenna module 140 may operate simultaneously.

The first antenna module 130 is an active antenna module, and the second antenna module 140 is a passive antenna module. An electromagnetic field of the first antenna module 130 may form an induced current. The induced current formed by the electromagnetic field of the first antenna module 130 may feed the second antenna module 140.

In this way, the first antenna module 130 is an active antenna module, and sensitivity of receiving a signal by the first antenna module 130 is relatively high. If the second antenna module 140 is a passive antenna module, no radio frequency communication signal is required to be input, and a radio frequency design of the first antenna module 130 is not affected.

It can be understood that radio wave energy radiated by an antenna is generally unevenly distributed in a spatial direction. In a case that the wearable device has only the first antenna module 130, a radiation effect may be poor. For example, the wearable body of the wearable device is biased toward the ground, and a maximum beam of the first antenna module 130 points to the ground. In this case, a radiation effect of the antenna is poor. A maximum beam of the antenna is a main beam of the antenna, that is, a main lobe of a directivity pattern of the antenna.

However, when the wearable device has both the first antenna module 130 and the second antenna module 140, the first antenna module 130 and the second antenna module 140 may constitute an antenna array. The phase difference between the first antenna module 130 and the second antenna module 140 may be adjusted by adjusting a phase of the second antenna module 140, thereby adjusting the directivity pattern of the antenna array. Therefore, a maximum beam of the antenna array does not point to the ground.

Therefore, the wearable device provided in this embodiment of this application includes a wearable body 110, a wearable band 120, a first antenna module 130, and a second antenna module 140, where the wearable body 110 is connected to the wearable band 120; the first antenna module 130 is disposed on the wearable body 110, and the second antenna module 140 is disposed on the wearable band 120; and a phase difference between the first antenna module 130 and the second antenna module 140 is adjustable, so that a directivity pattern of an antenna array is adjustable, where the antenna array includes the first antenna module and the second antenna module; and the first antenna module is an active antenna module, and the second antenna module is a passive antenna module. In this way, the second antenna module 140 is added based on the first antenna module 130, and the phase difference between the first antenna module 130 and the second antenna module 140 is adjustable, so that the directivity pattern of the antenna array including the first antenna module 130 and the second antenna module 140 can be adjusted by adjusting the phase difference, thereby improving a radiation effect of the antenna array.

As described above, the phase difference between the first antenna module 130 and the second antenna module 140 may be adjusted by adjusting the phase of the second antenna module 140, thereby adjusting the directivity pattern of the antenna array. The phase of the second antenna module 140 may be adjusted by adjusting an operating length of the second antenna module 140 (that is, an effective physical length of the second antenna module 140 for operating) and a distance between the first antenna module 130 and the second antenna module 140. A principle is as follows:

It is assumed that antenna forms of the first antenna module 130 and the second antenna module 140 are both dipole antennas, a current of the first antenna module 130 is $I_1$, a current of the second antenna module 140 is $I_2$, and the first antenna module 130 and the second antenna module 140 are placed in parallel, with a spacing of d. In addition, assuming that a dipole current is distributed according to a sine, a directivity pattern function of the antenna array including the first antenna module 130 and the second antenna module 140 may be obtained by means of approximate calculation.

$F(\theta) \simeq 1 + me^{j(kd \times \cos\theta + \psi)}$, where m represents a current-to-amplitude ratio $|I_2|/|I_1|$ of two dipole antennas. The following may be obtained by means of calculation through an impedance equation of a coupled dipole:

$$m = \sqrt{\frac{R_{21}^2 + X_{21}^2}{R_{22}^2 + X_{22}^2}}$$

$$\varphi = \pi + \arctan\frac{X_{21}}{R_{21}} - \arctan\frac{X_{22}}{R_{22}}$$

In the formula, R and X respectively represent resistors and reactors, $R_{21}$ represents a resistance part of mutual impedance of the second antenna module 140, $X_{21}$ represents a reactance part of the mutual impedance of the second antenna module 140, $R_{22}$ represents a resistance part of self impedance of the second antenna module 140, $X_{22}$ represents a reactance part of the self impedance of the second antenna module 140, and φ represents a phase of the second antenna module 140. The self impedance and the mutual impedance of the second antenna module 140 may be changed by changing the directivity pattern of the antenna array, the mutual impedance of the second antenna module 140 may be changed by changing a spacing d, and the self impedance of the second antenna module 140 may be changed by changing a structure size of the second antenna module 140, for example, a length.

Although an actual antenna structure shape and a spatial relationship between antennas are complex and it is difficult to describe an amplitude and phase relationship between a passive antenna and an active antenna through the simple formula, the principle is the same. The mutual impedance is changed by changing a distance between the passive antenna and the active antenna and the self impedance is changed by changing a length of the passive antenna. The mutual impedance and the self impedance affect an amplitude and a phase of an induction field of the passive antenna, thereby affecting a directivity pattern of the passive antenna (the second antenna module 140) and the active antenna (the first antenna module 130).

Figure 2:
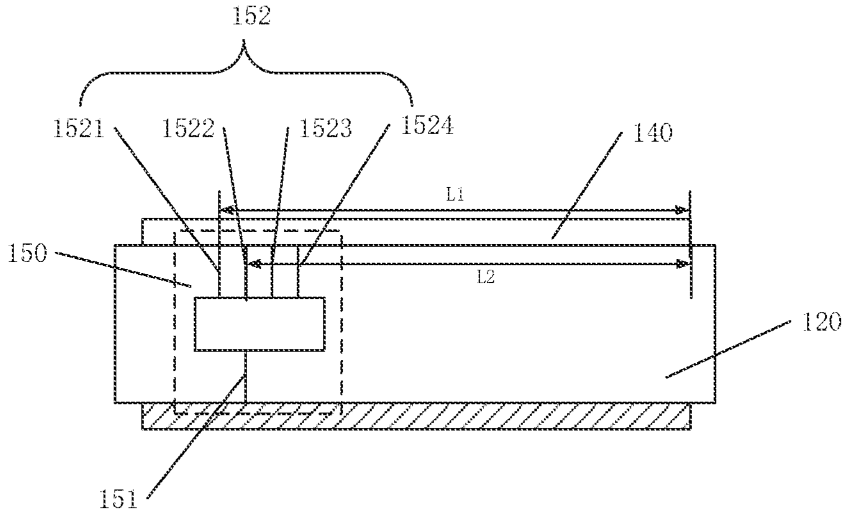
FIG. 2 is a schematic diagram of a wearable band of a wearable device according to an embodiment of this application.

FIG. 2 is a schematic diagram of a wearable band of a wearable device according to an embodiment of this application.

As shown in FIG. 2, to adjust an operating length of the second antenna module 140, the wearable device provided in this embodiment of this application may further include a switch assembly 150, and the phase difference between the first antenna module 130 and the second antenna module 140 is adjustable through the switch assembly 150. The switch assembly 150 may have one first end 151 and a plurality of second ends 152, the first end 151 of the switch assembly 150 may be grounded, and the plurality of second ends 152 of the switch assembly 150 may be all connected to the second antenna module 140.

Optionally, as shown in FIG. 2, locations at which all of the plurality of second ends 152 of the switch assembly 150 are connected to the second antenna module 140 may be different.

As shown in FIG. 2, the second end 152 may include a 1st one second end 1521, a 2nd second end 1522, a 3rd second end 1523, and a 4th second end 1524.

Optionally, the switch assembly 150 may include a control circuit configured to control the switch assembly. The first end 151 of the switch assembly 150 may be grounded. Specifically, the first end 151 may be connected to a grounding component, and the grounding component may be a metal plate whose potential is 0.

The operating length of the second antenna module 140 may be adjusted by adjusting a connection state between the first end 151 and the second end 152 of the switch assembly 150. For example, when the first end 151 is connected to the 1st second end 1521, the operating length of the second antenna module 140 is L1; when the first end 151 is connected to the $2^{nd}$ second end 1522, the operating length of the second antenna module 140 is L2; when the first end 151 is connected to the 3rd second end 1523, the operating length of the second antenna module 140 is L3; and when the first end 151 is connected to the 4th second end 1524, the operating length of the second antenna module 140 is L4, where there is apparently a relationship L1>L2>L3>L4. It should be noted that FIG. 2 shows only the operating lengths L1 and L2 of the second antenna module 140. Referring to L1 and L2 shown in FIG. 2, it may be learned that when the operating length of the second antenna module 140 is L3, L3 is a length from a location at which the second end 1523 is connected to the second antenna module 140 to a rightmost end of the second antenna module 140 in FIGS. 2, and L4 is a length from a location at which the second end 1524 is connected to the second antenna module 140 to a rightmost end of the second antenna module 140 in FIG. 2.

Figure 3:
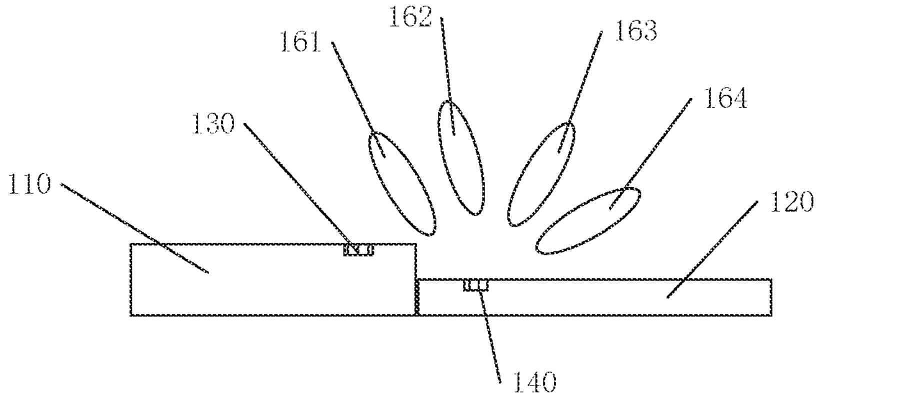
FIG. 3 is a schematic diagram of a side surface of a wearable device according to an embodiment of this application.

FIG. 3 is a schematic diagram of a side surface of a wearable device according to an embodiment of this application.

As shown in FIG. 3, FIG. 3 shows only a side face of the wearable body 110, a side face of the wearable band 120, a side face of the first antenna module 130, and a side face of the second antenna module 140. Assuming that an induction field of the second antenna module 140 is the same as a phase of the first antenna module 130, the operating length of the second antenna module is L0. When a relationship L1>L2>L0>L3>L4 is satisfied between L0, L1, L2, L3, and L4, a phase of the second antenna module 140 when the operating length is L1 or L2 lags behind that of the first antenna module 130, and the directivity pattern of the antenna array is biased toward the side of the second antenna module 140. Because of a reflection function of the floor, when the operating length of the second antenna module 140 is finally L1 or L2, the directivity pattern of the antenna array is biased toward the upper right shown in FIG. 3, and when the operating length of the second antenna module 140 is L2, the directivity pattern of the antenna array is a third directivity pattern 163 shown in FIG. 3. Because more phases lag behind when the operating length of the second antenna module 140 is L1, when the operating length of the second antenna module 140 is L1, the directivity pattern of the antenna array is a fourth directivity pattern 164 shown in FIG. 3. The phase of the second antenna module 140 when the operating length is L3 or L4 is ahead of that of the first antenna module 130, the directivity pattern of the antenna array is biased toward the side of the first antenna module 130. Because of a reflection function of the floor on the watch band, when the operating length of the second antenna module 140 is finally L3 or L4, the directivity pattern of the antenna array is biased toward the upper left shown in FIG. 3, and when the operating length of the second antenna module 140 is L3, the directivity pattern of the antenna array is a second directivity pattern 162 shown in FIG. 3. Because more phases are ahead of when the operating length of the second antenna module 140 is L4, when the operating length of the second antenna module 140 is L4, the directivity pattern of the antenna array is a first directivity pattern 161 shown in FIG. 3. Maximum beams in the first directivity pattern, the second directivity pattern, the third directivity pattern, and the fourth directivity pattern do not point to the ground.

It can be understood that the second end 152 may include only two second ends, or three second ends, or four second ends, or more second ends. Correspondingly, a connection state between the first end 151 and each second end in the second end 152 in the switch assembly 150, the operating length of the second antenna module 140 may have two different values, or three different values, or four different values, or more different values. A maximum beam in the directivity pattern of the antenna array may have two different directions, or three different directions, or four different directions, or more different directions. Provided that the operating length of the second antenna module 140 meets a specified requirement, that is, the operating length of the second antenna module 140 does not exceed or not less than a preset value that enables the maximum beam in the directivity pattern to not point to the ground, the maximum beam in the directivity pattern does not point to the ground.

In this way, the switch assembly 150 has a plurality of second ends, so that the first end of the switch assembly 150 is separately connected to one of the plurality of second ends of the switch assembly 150, thereby changing the operating length of the second antenna module 140. Further, the phase of the second antenna module 140 is changed, and the phase difference between the second antenna module 140 and the first antenna module 130 is changed, so that the directivity pattern of the antenna array is finally changed.

Optionally, as shown in FIG. 2, in a case that locations at which all of the plurality of second ends 152 of the switch assembly 150 are connected to the second antenna module 140 are different, the locations at which all of the plurality of second ends 152 are connected to the second antenna module 140 may be in a same straight line, and distances between locations at which any two adjacent second ends are connected to the second antenna module 140 may be constant.

In this way, the locations at which all of the plurality of second ends 152 are connected to the second antenna module 140 are in a same straight line, and the distance between locations at which any two adjacent second ends are connected to the second antenna module 140 is constant, so that it can be ensured that a layout of the switch assembly is relatively tidy, thereby facilitating manufacturing of the switch assembly and repairing during subsequent use.

It should be noted that the locations at which all of the plurality of second ends 152 are connected to the second antenna module 140 may be in a same straight line, or may not be in a same straight line. The distance between locations at which any two adjacent second ends are connected to the second antenna module 140 may be constant, or may not be constant. In actual application, the distance between locations at which any two adjacent second ends are connected to the second antenna module 140 may be designed according to a specific requirement.

Figure 4:
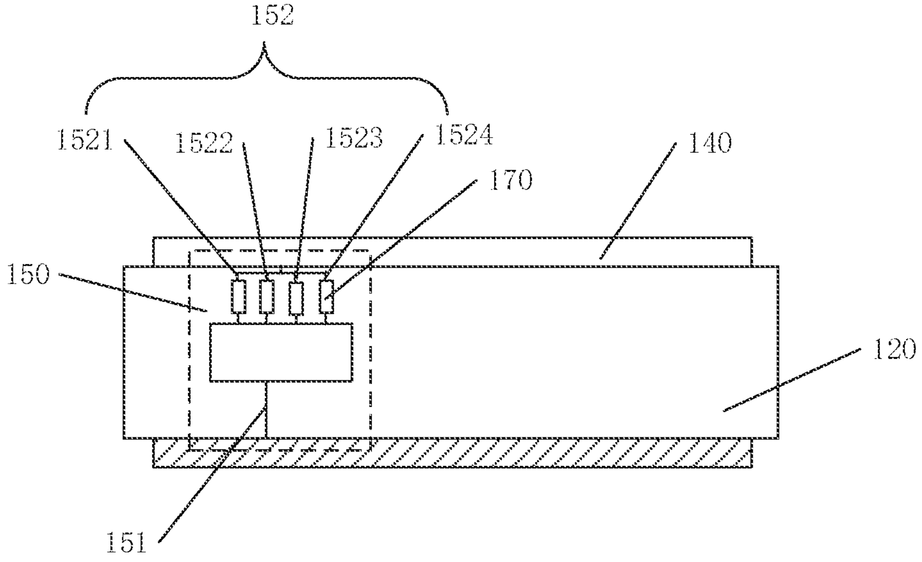
FIG. 4 is a schematic diagram of a wearable band of another wearable device according to an embodiment of this application.

FIG. 4 is a schematic diagram of a wearable band of another wearable device according to an embodiment of this application.

As shown in FIG. 4, locations at which all of the plurality of second ends 152 of the switch assembly 150 are connected to the second antenna module 140 are the same, and the wearable device may further include a reactance component 170. The phase difference between the first antenna module 130 and the second antenna module 140 is adjustable through the switch assembly 150 and the reactance component 170. There is at least one specified second end in the plurality of second ends 152 of the switch assembly 150, and the at least one specified second end is connected to the second antenna module 140 through the reactance component 170. The reactance component 170 includes a capacitor or an inductor.

It should be noted that FIG. 4 shows a case that the locations at which all of the plurality of second ends 152 of the switch assembly 150 are connected to the second antenna module 140 are the same. Alternatively, the locations at which all of the plurality of second ends 152 of the switch assembly 150 are connected to the second antenna module 140 may be different.

Optionally, there may be a plurality of reactance components 170. Specifically, the reactance component 170 may include only a plurality of capacitors or only a plurality of inductors; or may include a plurality of capacitors and a plurality of inductors; or may include one capacitor and a plurality of inductors; or may include one inductor and a plurality of capacitors.

In a case that there are a plurality of reactance components 170, the plurality of reactance components may be connected in parallel.

It can be understood that, in a case that the reactance component includes a capacitor, the at least one specified second end is connected to the capacitor and then is connected to the second antenna module 140, which is equivalent to that the operating length of the second antenna module 140 is increased, and a larger capacitance value of the capacitor indicates a longer operating length of the equivalent second antenna module 140. In a case that the reactance component includes an inductor, the at least one specified second end is connected to the inductor and then is connected to the second antenna module 140, which is equivalent to that the operating length of the second antenna module 140 is shortened, and a smaller inductance value of the inductor indicates a shorter operating length of the equivalent second antenna module 140.

In this way, the reactance component may be disposed between the second end of the switch assembly 150 and the second antenna module 140, to adjust the operating length of the second antenna module 140.

Figure 5:
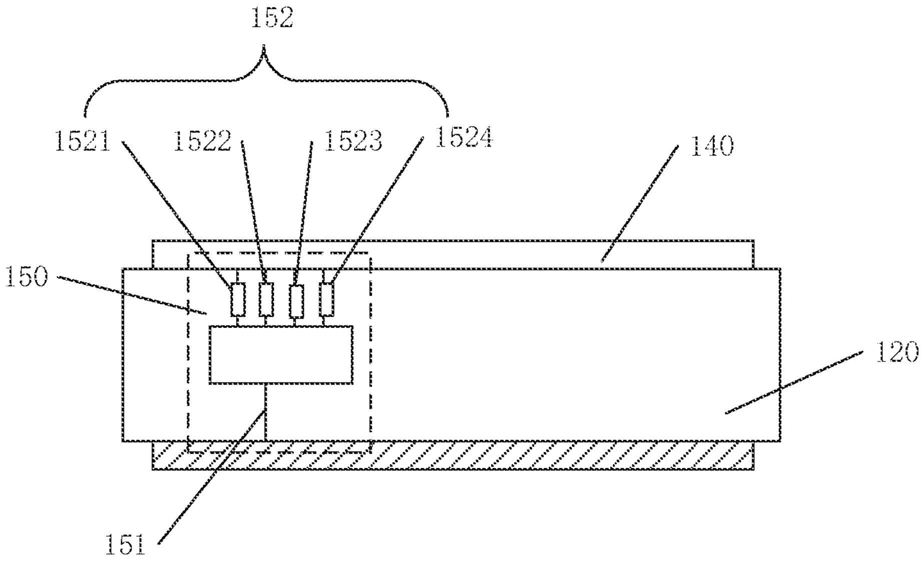
FIG. 5 is a schematic diagram of a wearable band of another wearable device according to an embodiment of this application.

FIG. 5 is a schematic diagram of a wearable band of another wearable device according to an embodiment of this application.

It should be noted that FIG. 5 shows a case that locations at which all of the plurality of second ends 152 of the switch assembly 150 are connected to the second antenna module 140 are different.

As shown in FIG. 4, in a case that the locations at which all of the plurality of second ends 152 of the switch assembly 150 are connected to the second antenna module 140 are the same, the at least one specified second end may be connected to the second antenna module 140 through the reactance component 170. In this case, the operating length of the second antenna module 140 is changed only by adjusting the connected reactance component 170 through the switch assembly 150.

As shown in FIG. 5, in a case that the locations at which all of the plurality of second ends 152 of the switch assembly 150 are connected to the second antenna module 140 are different, the at least one specified second end may also be connected to the second antenna module 140 through the reactance component 170. In this case, the operating length of the second antenna module 140 may be changed by adjusting a connection length of the second antenna module 140 and adjusting the connected reactance component 170.

Optionally, in an embodiment of this application, the wearable device includes the wearable body 110, the wearable band 120, the first antenna module 130, the second antenna module 140, and the reactance component 170 (excluding the switch assembly 150). The phase difference between the first antenna module 130 and the second antenna module 140 is adjustable through the reactance component 170. The reactance component 170 has a first end and a second end, the first end of the reactance component 170 is grounded, and the second end of the reactance component 170 is connected to the second antenna module 140.

In this case, the wearable device provided in this embodiment of this application adjusts the operating length of the second antenna module 140 only through the connected reactance component. As described above, a connected capacitor is equivalent to increasing the operating length of the second antenna module 140, and a connected inductor is equivalent to shortening the operating length of the second antenna module 140. Therefore, the connected reactance component may adjust the operating length of the second antenna module 140.

In this way, the operating length of the second antenna module 140 may be adjusted only through the connected reactance component.

On the basis that the wearable device provided in this embodiment of this application includes the reactance component 170, the wearable device may further include the switch assembly 150 (as shown in FIG. 4 and FIG. 5), the switch assembly 150 may have one first end 151 and a plurality of second ends 152, the first end 151 of the switch assembly 150 is grounded, and the plurality of second ends 152 of the switch assembly 150 are all connected to the second antenna module 140. Locations at which all of the plurality of second ends 152 of the switch assembly 150 are connected to the second antenna module 140 may be the same (as shown in FIG. 4), or locations at which all of the plurality of second ends 152 of the switch assembly 150 are connected to the second antenna module 140 may be different (as shown in FIG. 5).

Figure 6:
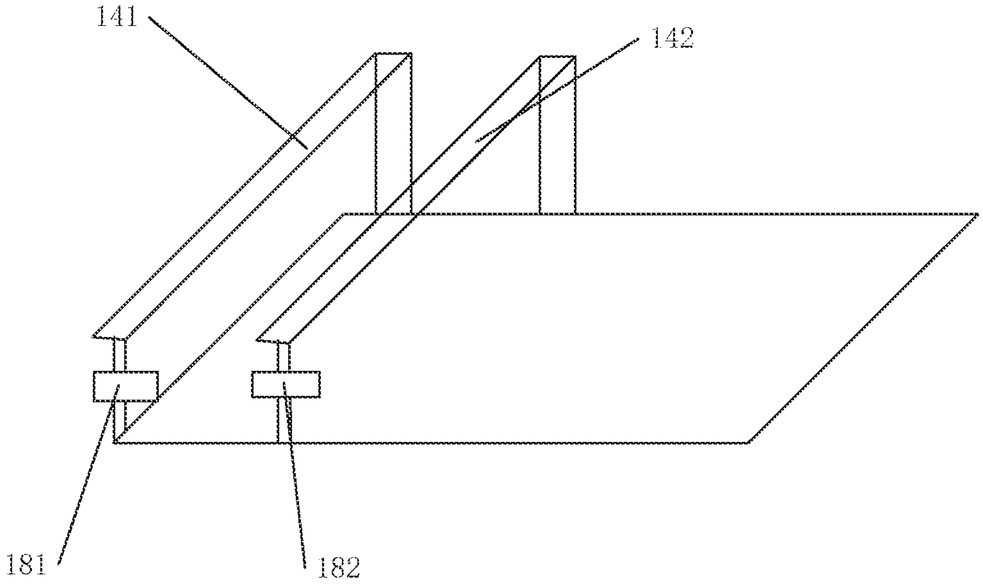
FIG. 6 is a schematic diagram of a wearable band of another wearable device according to an embodiment of this application.

FIG. 6 is a schematic diagram of a wearable band of another wearable device according to an embodiment of this application.

As shown in FIG. 6, the second antenna module 140 may include a first sub-antenna 141 and a second sub-antenna 142, and the first sub-antenna 141 is separated from the second sub-antenna 142 by a preset distance.

It can be understood that, although the following description uses an example in which the second antenna module 140 includes the first sub-antenna 141 and the second sub-antenna 142, the second antenna module 140 may further include a plurality of sub-antennas such as a third sub-antenna and a fourth sub-antenna, and a quantity of sub-antennas included in the second antenna module 140 is not limited herein. The wearable device may further include a switch assembly, the switch assembly includes a first switch element 181 and/or a second switch element 182, and the phase difference between the first antenna module 130 and the second antenna module 140 is adjustable through the first switch element 181 and/or the second switch element 182.

In a case that the switch assembly includes the first switch element 181, one end of the first switch element 181 is connected to the first sub-antenna 141, and the other end of the first switch element 181 is grounded. In addition, the first switch element 181 is connected to an end of the first sub-antenna 141.

In a case that the switch assembly includes the second switch element 182, one end of the second switch element 182 is connected to the second sub-antenna 142, and the other end of the second switch element 182 is grounded. In addition, the second switch element 182 is connected to an end of the second sub-antenna 142.

In a case that the switch assembly includes the first switch element 181 and the second switch element 182, one end of the first switch element 181 is connected to the first sub-antenna 141, and the other end of the first switch element 181 is grounded; and one end of the second switch element 182 is connected to the second sub-antenna 142, and the other end of the second switch element 182 is grounded.

It can be understood that, in a case that the switch assembly includes the first switch element 181, one end of the first sub-antenna 141 is grounded, and the other end is connected to the first switch element 181. In a case that the first switch assembly 181 is connected to one end of the first sub-antenna 141 and is connected to one end that is of the first switch assembly 181 and that is grounded, the first sub-antenna 141 is short-circuited, that is, the first sub-antenna 141 does not operate. In a case that the first switch assembly 181 is connected to one end of the first sub-antenna 141 and is not connected to one end that is of the first switch assembly 181 and that is grounded, the first sub-antenna 141 operates.

In a case that the switch assembly includes the second switch element 182, one end of the second sub-antenna 142 is grounded, and the other end is connected to the second switch element 182. In a case that the second switch element 182 is connected to one end of the second sub-antenna 142 and is connected to one end that is of the second switch assembly 182 and that is grounded, the second sub-antenna 142 is short-circuited, that is, the second sub-antenna 142 does not operate. In a case that the second switch assembly 182 is connected to one end of the second sub-antenna 142 and is not connected to one end that is of the second switch assembly 182 and that is grounded, the second sub-antenna 142 operates.

In a case that the switch assembly includes the first switch element 181 and the second switch element 182, one end of the first sub-antenna 141 is grounded, and the other end is connected to the first switch element 181. One end of the second sub-antenna 142 is grounded, and the other end is connected to the second switch element 182. When one end that is of the first switch assembly 181 and that is connected to the first sub-antenna 141 is connected to one end that is of the first switch assembly 181 and that is ground, and one end that is of the second switch assembly 182 and that is connected to the second sub-antenna 142 is not connected to one end that is of the second switch assembly 182 and that is grounded, the first sub-antenna 141 does not operate, and the second sub-antenna 142 operates. In a case that one end that is of the first switch assembly 181 and that is connected to the first sub-antenna 141 is not connected to one end that is of the first switch assembly 181 and that is ground, and one end that is of the second switch assembly 182 and that is connected to the second sub-antenna 142 is connected to one end that is of the second switch assembly 182 and that is grounded, the first sub-antenna 141 operates, and the second sub-antenna 142 does not operate.

Because the first sub-antenna 141 is separated from the second sub-antenna 142 by the preset distance, a distance between the first antenna module 130 and the first sub-antenna 141 is different from a distance between the first antenna module 130 and the second sub-antenna 142.

Figure 7:
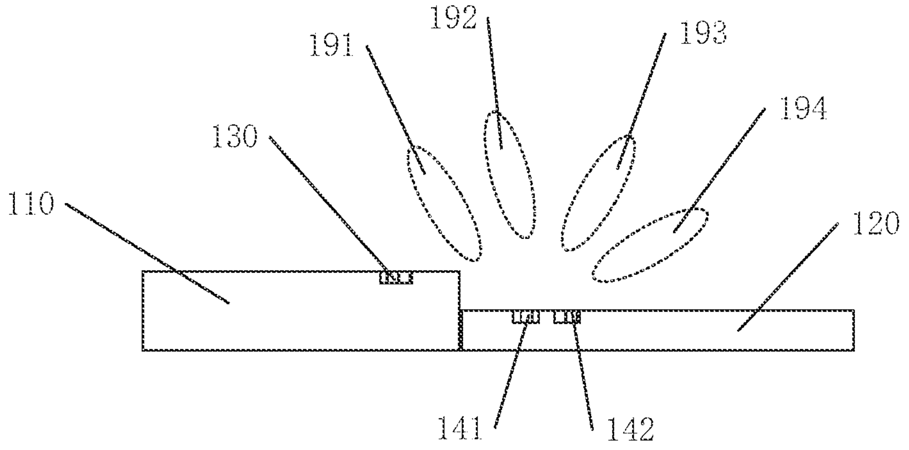
FIG. 7 is a schematic diagram of a side surface of another wearable device according to an embodiment of this application.

FIG. 7 is a schematic diagram of a side surface of another wearable device according to an embodiment of this application.

As shown in FIG. 7, if an operating length of the first sub-antenna 141 is controlled to enable a phase of the first sub-antenna 141 to be ahead of a phase $A_1$ of the first antenna module 130, and an operating length of the second sub-antenna 142 is controlled to enable a phase of the second sub-antenna 142 to be ahead of a phase $A_2$ of the first antenna module 130, where $A_1$ is less than $A_2$, a corresponding directivity pattern only when the first sub-antenna 141 operates is a second directivity pattern 192 in FIG. 7, and a directivity pattern only when the second sub-antenna 142 operates is a first directivity pattern 191 in FIG. 7. If an operating length of the first sub-antenna 141 is controlled to enable a phase of the first sub-antenna 14 to lag behind a phase $A_1$ of the first antenna module 130, and an operating length of the second sub-antenna 142 is controlled to enable a phase of the second sub-antenna 142 to lag behind a phase $A_2$ of the first antenna module 130, where $A_1$ is less than $A_2$, a corresponding directivity pattern only when the first sub-antenna 141 operates is a third directivity pattern 193 in FIG. 7, and a directivity pattern only when the second sub-antenna 142 operates is a fourth directivity pattern 194 in FIG. 7.

In this way, a connection state between one end that is of the first switch assembly 181 and that is connected to the first sub-antenna 141 and one end that is of the first switch assembly 181 and that is ground may be switched and a connection state between one end that is of the second switch assembly 182 and that is connected to the second sub-antenna 142 and one end that is of the second switch assembly 182 and that is grounded may be switched, and a distance between sub-antennas that operate in the first antenna module 130 and the second antenna module 140 is changed, to adjust the phase of the second antenna module 140, so as to adjust the directivity pattern of the antenna array including the first antenna module 130 and the second antenna module 140.

Figure 8:
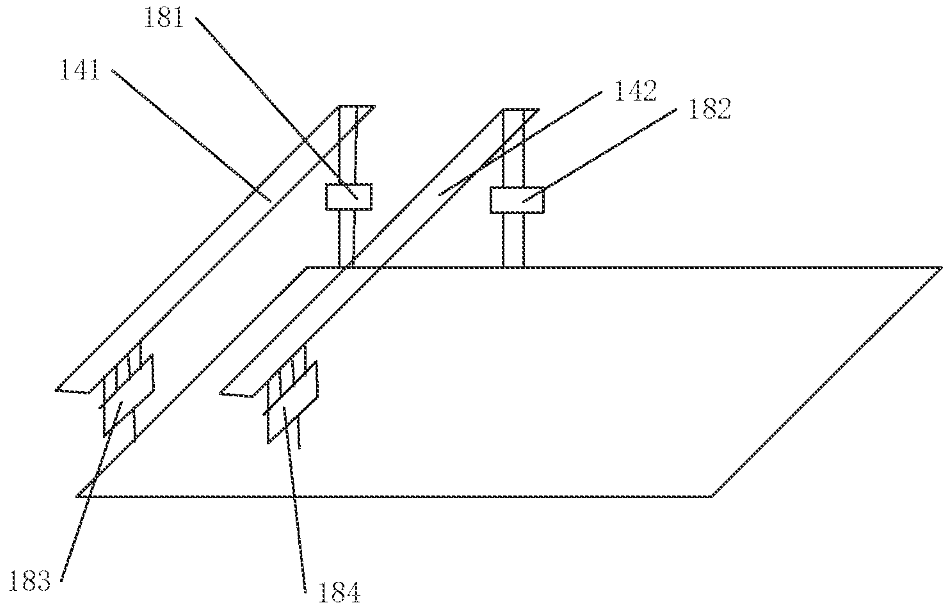
FIG. 8 is a schematic diagram of a wearable band of another wearable device according to an embodiment of this application.

FIG. 8 is a schematic diagram of a wearable band of another wearable device according to an embodiment of this application.

As shown in FIG. 8, the switch assembly further includes a third switch element 183 and/or a fourth switch element 184, and the phase difference between the first antenna module 130 and the second antenna module 140 is adjustable through the third switch element 183 and/or the fourth switch element 184.

In a case that the switch assembly includes the third switch element 183, the third switch element 183 has one first end and a plurality of second ends, the first end of the third switch element 183 is grounded, and the plurality of second ends of the third switch element 183 are all connected to the first sub-antenna 141.

At this point, in a case that one end of the first sub-antenna 141 is grounded through the first switch element 181, and the other end of the first sub-antenna 141 is grounded through the third switch element 183, the first sub-antenna 141 does not operate. In a case that one end of the first sub-antenna 141 is not grounded through the first switch element 181, the first sub-antenna 141 operates. In this case, the operating length of the first sub-antenna 141 may be changed by adjusting a connection state between the first end and each second end of the third switch element 183. A principle is the same as the foregoing principle described in FIG. 2.

Locations at which all of the plurality of second ends of the third switch element 183 are connected to the first sub-antenna 141 may be different, or locations at which all of the plurality of second ends of the third switch element 183 are connected to the first sub-antenna 141 may be the same. In a case that the locations at which all of the plurality of second ends of the third switch element 183 are connected to the first sub-antenna 141 are the same, the operating length of the first sub-antenna 141 may be adjusted by loading the reactance component on the third switch element 183. FIG. 8 shows a case that the locations at which all of the plurality of second ends of the third switch element 183 are connected to the first sub-antenna 141 are different.

In a case that the switch assembly includes the fourth switch element 184, the fourth switch element 184 has one first end and a plurality of second ends, the first end of the fourth switch element 184 is grounded, and the plurality of second ends of the fourth switch element 184 are all connected to the second sub-antenna 142.

At this point, in a case that one end of the second sub-antenna 142 is grounded through the second switch element 182, and the other end of the second sub-antenna 142 is grounded through the fourth switch element 184, the second sub-antenna 142 does not operate. In a case that one end of the second sub-antenna 142 is not grounded through the second switch element 182, the second sub-antenna 142 operates. In this case, the operating length of the second sub-antenna 142 may be changed by adjusting a connection state between the first end and each second end of the fourth switch element 184. A principle is the same as the foregoing principle described in FIG. 2.

Locations at which all of the plurality of second ends of the fourth switch element 184 are connected to the second sub-antenna 142 may be different, or locations at which all of the plurality of second ends of the fourth switch element 184 are connected to the second sub-antenna 142 may be the same. In a case that the locations at which all of the plurality of second ends of the fourth switch element 184 are connected to the second sub-antenna 142 are the same, the operating length of the second sub-antenna 142 may be adjusted by loading the reactance component on the fourth switch element 184.

FIG. 8 shows a case that the locations at which all of the plurality of second ends of the fourth switch element 184 are connected to the second sub-antenna 142 are different.

In a case that the switch assembly includes the third switch element 183 and the fourth switch element 184, the third switch element 183 has one first end and a plurality of second ends, the first end of the third switch element 183 is grounded, and the plurality of second ends of the third switch element 183 are all connected to the first sub-antenna 141; and the fourth switch element 184 has one first end and a plurality of second ends, the first end of the fourth switch element 184 is grounded, and the plurality of second ends of the fourth switch element 184 are all connected to the second sub-antenna 142.

Locations at which all of the plurality of second ends of the third switch element 183 are connected to the first sub-antenna 141 may be different, or locations at which all of the plurality of second ends of the third switch element 183 are connected to the first sub-antenna 141 may be the same. In a case that the locations at which all of the plurality of second ends of the third switch element 183 are connected to the first sub-antenna 141 are the same, the operating length of the first sub-antenna 141 may be adjusted by loading the reactance component on the third switch element 183. Locations at which all of the plurality of second ends of the fourth switch element 184 are connected to the second sub-antenna 142 may be different, or locations at which all of the plurality of second ends of the fourth switch element 184 are connected to the second sub-antenna 142 may be the same. In a case that the locations at which all of the plurality of second ends of the fourth switch element 184 are connected to the second sub-antenna 142 are the same, the operating length of the second sub-antenna 142 may be adjusted by loading the reactance component on the fourth switch element 184.

FIG. 8 shows only a case that the locations at which all of the plurality of second ends of the third switch element 183 are connected to the first sub-antenna 141 are different and the locations at which all of the plurality of second ends of the fourth switch element 184 are connected to the second sub-antenna 142 are different.

In this case, when sub-antennas used for operating in the second antenna module 140 are switched through the first switch element 181 and the second switch element 182, the operating length of the first sub-antenna 141 or the operating length of the second sub-antenna 142 may be changed through the third switch element 183 and the fourth switch element 184.

In this way, the phase of the second antenna module 140 may be changed in a plurality of manners, so that a direction of the maximum beam in the directivity pattern of the antenna array is adjusted, and a plurality of optional directivity patterns are provided.

Optionally, the wearable device may further include a first reactance component and/or a second reactance component, and the phase difference between the first antenna module 130 and the second antenna module 140 is adjustable through the first reactance component and/or the second reactance component.

In a case that the switch assembly includes the third switch element 183, locations at which all of the plurality of second ends of the third switch element 183 are connected to the first sub-antenna may be the same, or locations at which all of the plurality of second ends of the third switch element 183 are connected to the first sub-antenna 141 may be different; and there is at least one first target second end in the plurality of second ends of the third switch element 183, and the first target second end is connected to the first sub-antenna 141 through the first reactance component.

In a case that the switch assembly includes the fourth switch element 184, locations at which all of the plurality of second ends of the fourth switch element 184 are connected to the first sub-antenna may be the same, or locations at which all of the plurality of second ends of the fourth switch element 184 are connected to the second sub-antenna 142 may be different; and there is at least one second target second end in the plurality of second ends of the fourth switch element 184, and the second target second end is connected to the second sub-antenna 142 through the second reactance component.

In a case that the switch assembly includes the third switch element 183 and the fourth switch element 184, locations at which all of the plurality of second ends of the third switch element 183 are connected to the first sub-antenna may be the same, or locations at which all of the plurality of second ends of the third switch element 183 are connected to the first sub-antenna 141 may be different; locations at which all of the plurality of second ends of the fourth switch element 184 are connected to the first sub-antenna may be the same, or locations at which all of the plurality of second ends of the fourth switch element 184 are connected to the second sub-antenna 142 may be different; there is at least one first target second end in the plurality of second ends of the third switch element 182, and the first target second end is connected to the first sub-antenna 141 through the first reactance component; and there is at least one second target second end in the plurality of second ends of the fourth switch element 184, and the second target second end is connected to the second sub-antenna 142 through the second reactance component.

Optionally, there may be a plurality of first reactance components and/or a plurality of second reactance components. Specifically, the first reactance component and/or the second reactance component may include only a plurality of capacitors or a plurality of inductors; or may include a plurality of capacitors and a plurality of inductor; or may include one capacitor and a plurality of inductors; or may include one inductor and a plurality of capacitors.

In a case that there are a plurality of first reactance components, the plurality of first reactance components may be connected in parallel. In a case that there are a plurality of second reactance components, the plurality of second reactance components may be connected in parallel.

It can be understood that, the at least one target second end is connected to a capacitor and then is connected to the first sub-antenna 141 and/or the second sub-antenna 142, which is equivalent to that the operating length of the first sub-antenna 141 and/or the second sub-antenna 142 is increased, and a larger capacitance value of the capacitor indicates a longer operating length of the equivalent first sub-antenna 141 and/or the second sub-antenna 142. The at least one target second end is connected to an inductor and then is connected to the first sub-antenna 141 and/or the second sub-antenna 142, which is equivalent to that the operating length of the first sub-antenna 141 and/or the second sub-antenna 142 is shortened, and a smaller inductance value of the inductor indicates a shorter operating length of the equivalent first sub-antenna 141 and/or the second sub-antenna 142.

In this way, on the basis of adjusting sub-antennas that operate in the second antenna module 140, that is, adjusting the distance between the first antenna module 130 and the second antenna module 140, the reactance component may be disposed to adjust the operating length of the first sub-antenna 141 and/or the second sub-antenna 142.

It should be noted that antenna forms of the first antenna module 130 and the second antenna module 140 in this embodiment of this application may be monopole antennas, IFA antennas (that is, inverted 'F' antennas), or other forms of antennas.

In an embodiment of this application, the wearable device includes the wearable body 110, the wearable band 120, the first antenna module 130, the second antenna module 140, a first target reactance component, and a second target reactance component. The second antenna module 140 may include a first sub-antenna 141 and a second sub-antenna 142 (excluding the switch assembly 150). The phase difference between the first antenna module 140 and the second antenna module 142 is adjustable through the first target reactance component and/or the second target reactance component.

In a case that the wearable device includes the first target reactance component, the first target reactance component has a first end and a second end, the first end of the first target reactance component is grounded, and the second end of the first target reactance component is connected to the first sub-antenna 141;

- in a case that the wearable device includes the second target reactance component, the second target reactance component has a first end and a second end, the first end of the second target reactance component is grounded, and the second end of the first target reactance component is connected to the second sub-antenna 142; and
- in a case that the wearable device includes the first target reactance component and the second target reactance component, the first target reactance component has a first end and a second end, the first end of the first target reactance component is grounded, and the second end of the first target reactance component is connected to the first sub-antenna 141; and the second target reactance component has a first end and a second end, the first end of the second target reactance component is grounded, and the second end of the first target reactance component is connected to the second sub-antenna 142.

In this case, the wearable device provided in this embodiment of this application adjusts the operating length of the first sub-antenna 141 and/or the second sub-antenna 142 in the second antenna module 140 only through the connected reactance component. As described above, a connected capacitor is equivalent to increasing an operating length of an antenna, and a connected inductor is equivalent to shortening an operating length of an antenna. Therefore, the connected reactance component may adjust the operating length of the first sub-antenna 141 and/or the second sub-antenna 142 in the second antenna module 140.

In this way, the operating length of the first sub-antenna 141 may be adjusted only through the connected first target reactance component, and the operating length of the second sub-antenna 142 is adjusted only through the connected second target reactance component.

Figure 9:
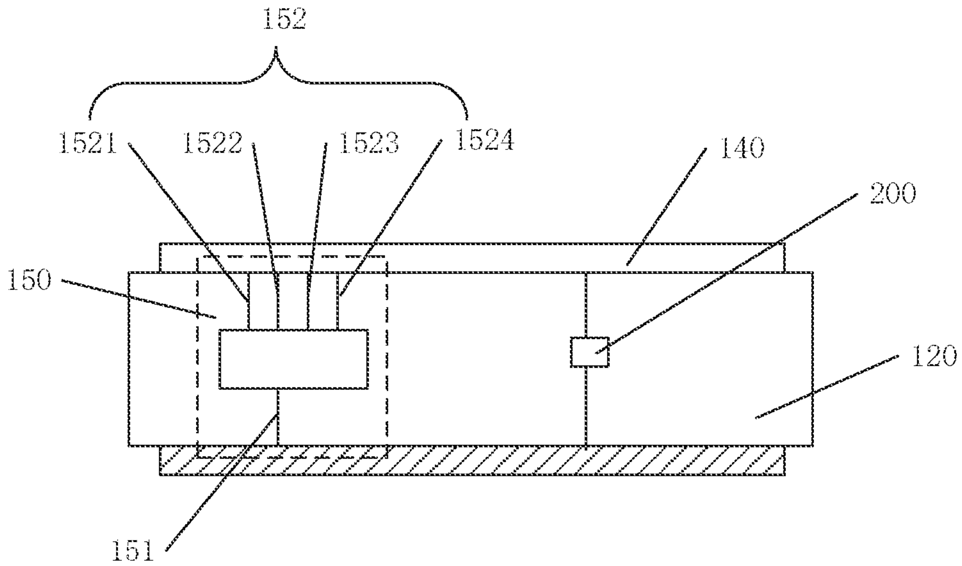
FIG. 9 is a schematic diagram of a wearable band of another wearable device according to an embodiment of this application.

FIG. 9 is a schematic diagram of a wearable band of another wearable device according to an embodiment of this application.

Figure 10:
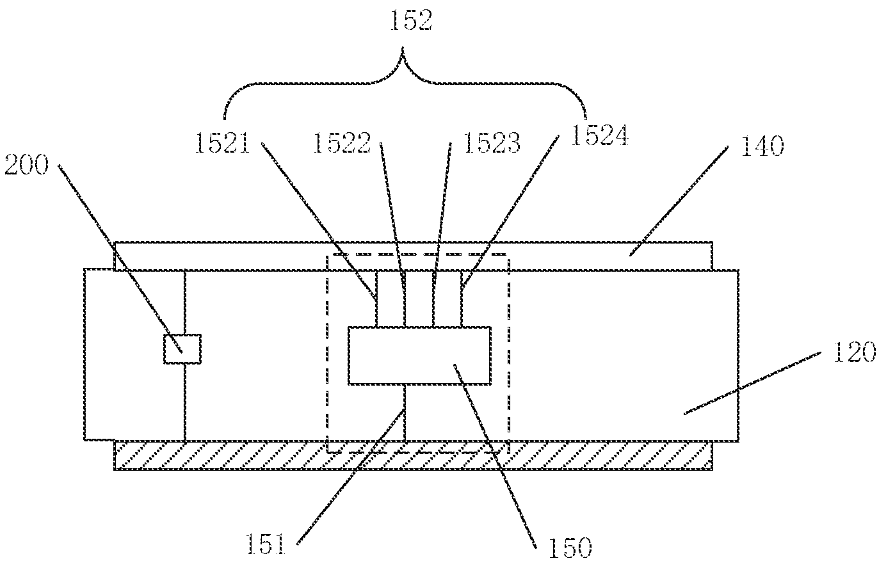
FIG. 10 is a schematic diagram of a wearable band of still another wearable device according to an embodiment of this application.

FIG. 10 is a schematic diagram of a wearable band of another wearable device according to an embodiment of this application.

As shown in FIG. 9 and FIG. 10, optionally, the wearable device provided in this embodiment of this application may further include a mode switching switch 200. One end of the mode switching switch 200 is connected to the second antenna module 140, and the other end is grounded.

As shown in FIG. 9, when the two ends of the mode switching switch 200 are disconnected, an antenna form of the second antenna module 140 is a monopole form, an operating mode thereof is a monopole mode of a quarter wavelength, and an operating frequency is f1. In this case, the switch assembly 150 may change the operating length of the second antenna module 140 at the operating frequency f1, to adjust the directivity pattern. When the two ends of the mode switching switch 200 are connected, an antenna form of the second antenna module 140 changes to a ring antenna, an operating mode thereof is a Loop mode, and an operating frequency is f2. Generally, f2=2*f1. In this case, the switch assembly 150 may adjust the directivity pattern at the operating frequency f2.

As shown in FIG. 10, when the mode switching switch 200 is disconnected, an antenna form is a T-type antenna, and there are three operating modes. When the mode switching switch 200 is closed, an antenna form is an IFA antenna, and there are two operating modes. Operating frequency bands of the antenna in different operating modes are different. In this way, the second antenna module 140 may operate in five different operating frequency bands, and the operating frequency band may be switched through the mode switching switch 200.

In this way, the mode switching switch 200 may be used to implement switching of an operating frequency band of the second antenna module 140, and the directivity pattern is adjusted through the switch assembly 150. Finally, directivity patterns of the second antenna module 140 in a plurality of operating frequency bands may be adjusted.

The wearable device provided in this embodiment of this application may be a watch. When the wearable device is a watch, the wearable body of the wearable device may be a watch face, and the wearable band of the wearable device may be a watch band. The first antenna module 130 may be disposed inside the watch face, may be disposed on a surface of the watch face, or may be disposed on an edge of the watch face, and the second antenna module 140 may be disposed inside the watch band, or may be disposed on a surface of the watch band. The second antenna module 140 may be disposed at a location on the watch band near the watch face. Optionally, the second antenna module 140 may be alternatively disposed on a connector that connects the watch face to the watch band.

Optionally, when the wearable device provided in this embodiment of this application is a watch, the watch may further include a third antenna module, and a structure and a form of the third antenna module may be the same as those of the second antenna module. The second antenna module may be disposed on a watch band on one side of a watch face of the watch, and the third antenna module may be disposed on a watch band on the other side of the watch face. The second antenna module and the third antenna module may operate at the same time, or may not operate at the same time.

Corresponding to the wearable device provided in this embodiment of this application, an embodiment of this application further provides a method for controlling the wearable device.

Figure 11:
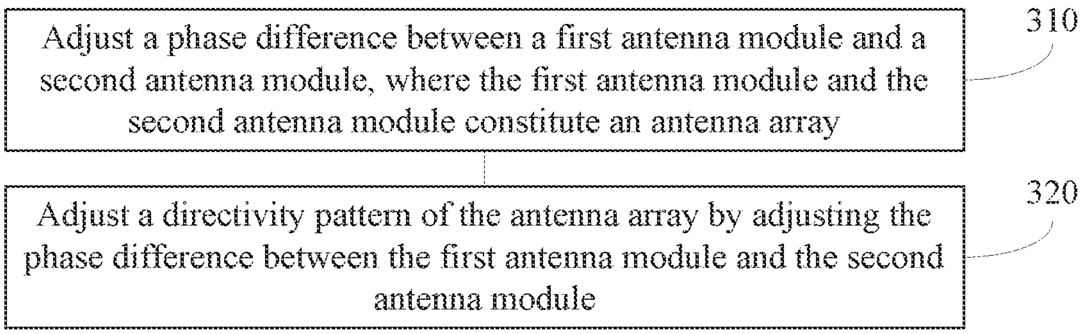
FIG. 11 is a flowchart of a method for controlling the wearable device according to an embodiment of this application.

FIG. 11 is a flowchart of a method for controlling the wearable device according to an embodiment of this application. The method for controlling the wearable device shown in FIG. 11 may be applied to any wearable device provided in the foregoing embodiment.

As shown in FIG. 11, the method for controlling the wearable device provided in this embodiment of this application may include the following steps:

Step 310: Adjust a phase difference of the antenna array.

Step 320: Adjust a directivity pattern of the antenna array by adjusting the phase difference of the antenna array.

It can be understood that both a phase and an amplitude of an induction field of an antenna affect a directivity pattern of the antenna, and a phase of the antenna greatly affects the directivity pattern of the antenna. Therefore, in the method for controlling the wearable device provided in this embodiment of this application, the directivity pattern of the antenna array is adjusted by mainly adjusting a phase difference between the first antenna module and the second antenna module.

In this way, when the phase difference between the first antenna module and the second antenna module is different, and a direction (a direction of a maximum beam) of the directivity pattern of the antenna array is also different, the phase difference between the first antenna module and the second antenna module may be adjusted, so that the maximum beam in the directivity pattern of the antenna array does not point to the ground.

The phase difference between the first antenna module and the second antenna module may be adjusted by adjusting an operating length of the second antenna module; and the phase difference is changed by adjusting a distance between the second antenna module and the first antenna module.

The wearable device includes a switch assembly, the switch assembly has one first end and a plurality of second ends, the first end of the switch assembly is grounded, and the plurality of second ends of the switch assembly are connected to the second antenna module. In this case, the adjusting a phase difference of the antenna array may include:

adjusting an operating length of the second antenna module by changing a connection state between the first end and the plurality of second ends in the switch assembly, where the operating length of the second antenna module is an effective length of the second antenna for operating; and the connection state includes a conducting state and a disconnected state; and adjusting the phase difference by adjusting the operating length of the second antenna module.

It can be understood that when the first end of the switch assembly is connected to one second end, a connection state between the first end and the second end is in a conducting state. When the first end of the switch assembly is disconnected from one second end, a connection state between the first end and the second end is a disconnected state.

For adjustment on the operating length of the second antenna module, refer to the foregoing descriptions in FIG. 2, FIG. 4, or FIG. 5.

In this way, the first end of the switch assembly may be connected to different second ends, so that the second antenna module may operate at different operating lengths, or the second end connected to the first end may be adjusted to adjust a length of the second antenna module, so as to adjust the phase difference between the first antenna module and the second antenna module.

In addition, the wearable device may further include a switch assembly, and the switch assembly may include a first switch element and/or a second switch element.

In a case that the switch assembly includes the first switch element, one end of the first switch element is connected to the first sub-antenna, and the other end of the first switch element is grounded;

in a case that the switch assembly includes the second switch element, one end of the second switch element is connected to the second sub-antenna, and the other end of the second switch element is grounded; and in a case that the switch assembly includes the first switch element and the second switch element, one end of the first switch element is connected to the first sub-antenna, and the other end of the first switch element is grounded; and one end of the second switch element is connected to the second sub-antenna, and the other end of the second switch element is grounded. In this case, the adjusting a phase difference of the antenna array includes:

adjusting a distance between the second antenna module and the first antenna module by changing an operating state of the first switch element and/or the second switch element; and adjusting the phase difference by adjusting the distance between the second antenna module and the first antenna module.

For adjustment on the distance between the second antenna module and the first antenna module, refer to the foregoing descriptions in FIG. 6.

In this way, sub-antennas used for operating in the second antenna module may be switched through the first switch element and/or the second switch element. Because distances between sub-antennas in the second antenna module and the first antenna module are different, different sub-antennas may operate to adjust the distance between the second antenna module and the first antenna module, so as to adjust the phase difference.

It should be understood that the foregoing method for controlling the wearable device may be applied to the wearable device provided in this embodiment of this application.

The foregoing embodiments of this application focus on describing differences between the embodiments, and different optimization features of the embodiments may be combined to form better embodiments provided that they are not contradictory. For brevity, details are not described herein again.

It should be further noted that, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or device that includes the element.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A wearable device, wherein the wearable device comprises:

a wearable body, a wearable band, a first antenna module and a second antenna module, wherein the wearable body is connected to the wearable band; and the first antenna module is disposed on the wearable body, and the second antenna module is disposed on the wearable band; and a phase difference between the first antenna module and the second antenna module is adjustable, so that a directivity pattern of an antenna array is adjustable, wherein the antenna array comprises the first antenna module and the second antenna module; and the first antenna module is an active antenna module, and the second antenna module is a passive antenna module;

wherein the wearable device further comprises a switch assembly, and the phase difference between the first antenna module and the second antenna module is adjustable through the switch assembly; and the switch assembly has one first end and a plurality of second ends, the first end of the switch assembly is grounded, and the plurality of second ends of the switch assembly are all connected to the second antenna module;

wherein locations at which all of the plurality of second ends of the switch assembly are connected to the second antenna module are different, the locations at which all of the plurality of second ends are connected to the second antenna module are in a same straight line, and a distance between locations at which any two adjacent second ends are connected to the second antenna module is constant.

2. The wearable device according to claim 1, wherein locations at which all of the plurality of second ends of the switch assembly are connected to the second antenna module are the same, and the wearable device further comprises a reactance component, wherein the phase difference between the first antenna module and the second antenna module is adjustable through the switch assembly and the reactance component;

there is at least one specified second end in the plurality of second ends of the switch assembly, and the at least one specified second end is connected to the second antenna module through the reactance component; and the reactance component comprises a capacitor or an inductor.

3. The wearable device according to claim 1, wherein the wearable device further comprises a reactance component, and the phase difference between the first antenna module and the second antenna module is adjustable through the reactance component; and the reactance component has a first end and a second end, the first end of the reactance component is grounded, and the second end of the reactance component is connected to the second antenna module.

4. The wearable device according to claim 1, wherein the second antenna module comprises a first sub-antenna and a second sub-antenna, and the first sub-antenna is separated from the second sub-antenna by a preset distance.

5. The wearable device according to claim 4, wherein the wearable device further comprises a switch assembly, the switch assembly comprises a first switch element and/or a second switch element, and the phase difference between the first antenna module and the second antenna module is adjustable through the first switch element and/or the second switch element;

in a case that the switch assembly comprises the first switch element, one end of the first switch element is connected to the first sub-antenna, and the other end of the first switch element is grounded;

in a case that the switch assembly comprises the second switch element, one end of the second switch element is connected to the second sub-antenna, and the other end of the second switch element is grounded; and in a case that the switch assembly comprises the first switch element and the second switch element, one end of the first switch element is connected to the first sub-antenna, and the other end of the first switch element is grounded; and one end of the second switch element is connected to the second sub-antenna, and the other end of the second switch element is grounded.

6. The wearable device according to claim 5, wherein the switch assembly further comprises a third switch element and/or a fourth switch element, and the phase difference between the first antenna module and the second antenna module is adjustable through the third switch element and/or the fourth switch element;

in a case that the switch assembly comprises the third switch element, the third switch element has one first end and a plurality of second ends, the first end of the third switch element is grounded, and the plurality of second ends of the third switch element are all connected to the first sub-antenna;

in a case that the switch assembly comprises the fourth switch element, the fourth switch element has one first end and a plurality of second ends, the first end of the fourth switch element is grounded, and the plurality of second ends of the fourth switch element are all connected to the second sub-antenna; and in a case that the switch assembly comprises the third switch element and the fourth switch element, the third switch element has one first end and a plurality of second ends, the first end of the third switch element is grounded, and the plurality of second ends of the third switch element are all connected to the first sub-antenna; and the fourth switch element has one first end and a plurality of second ends, the first end of the fourth switch element is grounded, and the plurality of second ends of the fourth switch element are all connected to the second sub-antenna.

7. The wearable device according to claim 6, wherein the wearable device further comprises a first reactance component and/or a second reactance component, and the phase difference between the first antenna module and the second antenna module is adjustable through the first reactance component and/or the second reactance component;

in a case that the switch assembly comprises the third switch element, locations at which all of the plurality of second ends of the third switch element are connected to the first sub-antenna are the same, there is at least one first target second end in the plurality of second ends of the third switch element, and the first target second end is connected to the first sub-antenna through the first reactance component;

in a case that the switch assembly comprises the fourth switch element, locations at which all of the plurality of second ends of the fourth switch element are connected to the second sub-antenna are the same, there is at least one second target second end in the plurality of second ends of the fourth switch element and the second target second end is connected to the second sub-antenna through the second reactance component; and in a case that the switch assembly comprises the third switch element and the fourth switch element, there is at least one first target second end in the plurality of second ends of the third switch element, and the first target second end is connected to the first sub-antenna through the first reactance component; and there is at least one second target second end in the plurality of second ends of the fourth switch element, and the second target second end is connected to the second sub-antenna through the second reactance component.

8. The wearable device according to claim 4, wherein the wearable device further comprises a first target reactance component and a second target reactance component, and the phase difference between the first antenna module and the second antenna module is adjustable through the first target reactance component and/or the second target reactance component;

in a case that the wearable device comprises the first target reactance component, the first target reactance component has a first end and a second end, the first end of the first target reactance component is grounded, and the second end of the first target reactance component is connected to the first sub-antenna;

in a case that the wearable device comprises the second target reactance component, the second target reactance component has a first end and a second end, the first end of the second target reactance component is grounded, and the second end of the second target reactance component is connected to the second sub-antenna; and in a case that the wearable device comprises the first target reactance component and the second target reactance component, the first target reactance component has a first end and a second end, the first end of the first target reactance component is grounded, and the second end of the first target reactance component is connected to the first sub-antenna; and the second target reactance component has a first end and a second end, the first end of the second target reactance component is grounded, and the second end of the second target reactance component is connected to the second sub-antenna.

9. A method for controlling a wearable device, wherein the wearable device comprises:

a wearable body, a wearable band, a first antenna module and a second antenna module, wherein the wearable body is connected to the wearable band; and the first antenna module is disposed on the wearable body, and the second antenna module is disposed on the wearable band; and a phase difference between the first antenna module and the second antenna module is adjustable, so that a directivity pattern of an antenna array is adjustable, wherein the antenna array comprises the first antenna module and the second antenna module; and the first antenna module is an active antenna module, and the second antenna module is a passive antenna module;

wherein the wearable device further comprises a switch assembly, and the phase difference between the first antenna module and the second antenna module is adjustable through the switch assembly; and the switch assembly has one first end and a plurality of second ends, the first end of the switch assembly is grounded, and the plurality of second ends of the switch assembly are all connected to the second antenna module;

wherein locations at which all of the plurality of second ends of the switch assembly are connected to the second antenna module are different, the locations at which all of the plurality of second ends are connected to the second antenna module are in a same straight line, and a distance between locations at which any two adjacent second ends are connected to the second antenna module is constant;

wherein the method comprises:

adjusting a phase difference of the antenna array; and adjusting a directivity pattern of the antenna array by adjusting the phase difference of the antenna array.

10. The method according to claim 9, wherein the adjusting a phase difference of the antenna array comprises:

adjusting an operating length of the second antenna module by changing a connection state between the first end and the plurality of second ends in the switch assembly, wherein the operating length of the second antenna module is an effective length of the second antenna module for operating; and the connection state comprises a conducting state and a disconnected state; and adjusting the phase difference by adjusting the operating length of the second antenna module.

11. The method according to claim 9, wherein the second antenna module comprises a first sub-antenna and a second sub-antenna, the wearable device comprises a switch assembly, and the switch assembly comprises a first switch element and/or a second switch element;

in a case that the switch assembly comprises the first switch element, one end of the first switch element is connected to the first sub-antenna, and the other end of the first switch element is grounded;

in a case that the switch assembly comprises the second switch element, one end of the second switch element is connected to the second sub-antenna, and the other end of the second switch element is grounded; and in a case that the switch assembly comprises the first switch element and the second switch element, one end of the first switch element is connected to the first sub-antenna, and the other end of the first switch element is grounded; and one end of the second switch element is connected to the second sub-antenna, and the other end of the second switch element is grounded; and the adjusting a phase difference of the antenna array comprises:

adjusting a distance between the second antenna module and the first antenna module by changing an operating state of the first switch element and/or the second switch element; and adjusting the phase difference by adjusting the distance between the second antenna module and the first antenna module.

12. The method according to claim 11, wherein the wearable device further comprises a first target reactance component and a second target reactance component, and the phase difference between the first antenna module and the second antenna module is adjustable through the first target reactance component and/or the second target reactance component;

in a case that the wearable device comprises the first target reactance component, the first target reactance component has a first end and a second end, the first end of the first target reactance component is grounded, and the second end of the first target reactance component is connected to the first sub-antenna;

in a case that the wearable device comprises the second target reactance component, the second target reactance component has a first end and a second end, the first end of the second target reactance component is grounded, and the second end of the second target reactance component is connected to the second sub-antenna; and in a case that the wearable device comprises the first target reactance component and the second target reactance component, the first target reactance component has a first end and a second end, the first end of the first target reactance component is grounded, and the second end of the first target reactance component is connected to the first sub-antenna; and the second target reactance component has a first end and a second end, the first end of the second target reactance component is grounded, and the second end of the second target reactance component is connected to the second sub-antenna.

13. The method according to claim 9, wherein locations at which all of the plurality of second ends of the switch assembly are connected to the second antenna module are the same, and the wearable device further comprises a reactance component, wherein the phase difference between the first antenna module and the second antenna module is adjustable through the switch assembly and the reactance component;

there is at least one specified second end in the plurality of second ends of the switch assembly, and the at least one specified second end is connected to the second antenna module through the reactance component; and the reactance component comprises a capacitor or an inductor.

14. The method according to claim 9, wherein the wearable device further comprises a reactance component, and the phase difference between the first antenna module and the second antenna module is adjustable through the reactance component; and the reactance component has a first end and a second end, the first end of the reactance component is grounded, and the second end of the reactance component is connected to the second antenna module.

15. The method according to claim 9, wherein the second antenna module comprises a first sub-antenna and a second sub-antenna, and the first sub-antenna is separated from the second sub-antenna by a preset distance.

16. The method according to claim 15, wherein the wearable device further comprises a switch assembly, the switch assembly comprises a first switch element and/or a second switch element, and the phase difference between the first antenna module and the second antenna module is adjustable through the first switch element and/or the second switch element;

in a case that the switch assembly comprises the first switch element, one end of the first switch element is connected to the first sub-antenna, and the other end of the first switch element is grounded;

in a case that the switch assembly comprises the second switch element, one end of the second switch element is connected to the second sub-antenna, and the other end of the second switch element is grounded; and in a case that the switch assembly comprises the first switch element and the second switch element, one end of the first switch element is connected to the first sub-antenna, and the other end of the first switch element is grounded; and one end of the second switch element is connected to the second sub-antenna, and the other end of the second switch element is grounded.

17. The method according to claim 16, wherein the switch assembly further comprises a third switch element and/or a fourth switch element, and the phase difference between the first antenna module and the second antenna module is adjustable through the third switch element and/or the fourth switch element;

in a case that the switch assembly comprises the third switch element, the third switch element has one first end and a plurality of second ends, the first end of the third switch element is grounded, and the plurality of second ends of the third switch element are all connected to the first sub-antenna;

in a case that the switch assembly comprises the fourth switch element, the fourth switch element has one first end and a plurality of second ends, the first end of the fourth switch element is grounded, and the plurality of second ends of the fourth switch element are all connected to the second sub-antenna; and in a case that the switch assembly comprises the third switch element and the fourth switch element, the third switch element has one first end and a plurality of second ends, the first end of the third switch element is grounded, and the plurality of second ends of the third switch element are all connected to the first sub-antenna; and the fourth switch element has one first end and a plurality of second ends, the first end of the fourth switch element is grounded, and the plurality of second ends of the fourth switch element are all connected to the second sub-antenna.

18. The method according to claim 17, wherein the wearable device further comprises a first reactance component and/or a second reactance component, and the phase difference between the first antenna module and the second antenna module is adjustable through the first reactance component and/or the second reactance component;

in a case that the switch assembly comprises the third switch element, locations at which all of the plurality of second ends of the third switch element are connected to the first sub-antenna are the same, there is at least one first target second end in the plurality of second ends of the third switch element, and the first target second end is connected to the first sub-antenna through the first reactance component;

in a case that the switch assembly comprises the fourth switch element, locations at which all of the plurality of second ends of the fourth switch element are connected to the second sub-antenna are the same, there is at least one second target second end in the plurality of second ends of the fourth switch element and the second target second end is connected to the second sub-antenna through the second reactance component; and in a case that the switch assembly comprises the third switch element and the fourth switch element, there is at least one first target second end in the plurality of second ends of the third switch element, and the first target second end is connected to the first sub-antenna through the first reactance component; and there is at least one second target second end in the plurality of second ends of the fourth switch element, and the second target second end is connected to the second sub-antenna through the second reactance component.

* * * * *